United States Patent Office

3,795,598
Patented Mar. 5, 1974

3,795,598
PHOTOPOLYMERIZATION PROCESS FOR THE MANUFACTURE OF ALTERNATING COPOLYMERS OF BUTADIENE AND ACRYLONITRILE
Toshio Yukuta, Kouichi Iwami, and Akira Onishi, Tokyo, and Yutaka Iseda, Kyoto, Japan, assignors to Bridgestone Tire Company Limited, Tokyo, Japan
No Drawing. Filed Oct. 12, 1970, Ser. No. 80,252
Claims priority, application Japan, Oct. 14, 1969,
44/81,548, 44/81,549
Int. Cl. C08d 1/00, 1/12; C08f 1/16
U.S. Cl. 204—159.24
19 Claims

ABSTRACT OF THE DISCLOSURE

Alternate copolymers of acrylonitrile and butadiene are manufactured by means of photopolymerization in the presence of (A) a catalyst comprising at least one compound selected from a group consisting of certain metal halides and organic metal halides and organometallic compounds and (B) a photosensitizer comprising at least one compound selected from a group consisting of benzene aromatic haydrocarbons and halides thereof, some polynuclear aromatic hydrocarbons and halides thereof, some heterocyclic compounds, aromatic or aliphatic hydrocarbon compounds, some ketone, glyoxal and aldehyde compounds, some sulfonic compounds. Thereby the alternating copolymers can be obtained in higher yield and with lesser gel formation. As occasion demands (C) an anti-gelling agent is added to the reactants which agent comprises at least one compound selected from a group consisting of aliphatic halogenated hydrocarbons, alicyclic halogenated hydrocarbons, iodine, sulfide or disulfide hydrocarbons, thiol or dithiol hydrocarbons, aromatic ethylenic hydrocarbons, some transition metal compounds.

---

The present invention relates to a new process for the manufacture of alternating or alternate copolymers of acrylonitrile and butadiene by means of the photopolymerization.

There has recently been increasing interests in such copolymers of alternate structure also in respect of elastomers as might be considered as extremity of development of random structure copolymers up to the corresponding copolymers of regular structure. As alternate copolymers, the combination of styrene and maleic anhydride was in public knowledge (Ber., 63B, 3213 (1930)). It was also in public knowledge that an acrylonitrile-styrene alternate copolymer can be obtained by forming a complex compound of acrylonitrile with zinc chloride and ethylaluminum chloride and then radical-polymerizing styrene therewith ("Kobunshi" or Highpolymers, 16 1172 (1967)). Furthermore synthesis of alternate copolymers of ethylene with butadiene (Markomol. Chem., 79, 161 (1964)) and the acrylonitrile with propylene (Polymer Letters, 5, 47 (1967)) was reported although they were not of so high molecular weight.

It has recenty be reported that an alternate copolymer of butadiene and acrylonitrile of which properties are quite interested as synthetic rubber can be manufactured according to the thermal polymerization method with using a catalyst system comprising an organic aluminum halide and transition metal compound (The 17th "Highpolymers" Annual Assembly in Tokyo, 1968), in which the high correctness or regularity of alternation has been demonstrated by means of infrared absorption spectrum, nuclear magnetic resonance absorption spectrum, elemental analysis and other results, and some of the properties of the resulting alternate copolymer disclosed (see also patent application Ser. No. 740,342 and filed June 26, 1968, now abandoned in favor of continuation in part application Ser. No. 103,178, filed Dec. 31, 1970 and now issued as U.S. Pat. No. 3,773,854). According to the report or disclosure, the copolymer obtained according to said method is of alternate structure having stereouniformity wherein every butadiene unit is connected at trans-1,4 bonding, and as for physical properties of the vulcanized copolymer, nevertheless hardness and modulus thereof are lower than those of the usual superhigh nitrile NBR, breaking strength, elongation as well as rebound elasticity are higher. In comparison with the conventional superhigh nitrile NBR, the newly provided copolymer is, when vulcanized, substantially same in oil resistant swelling degree but superior in oil resistant strength and strength at higher temperatures. It is very interesting that said new synthetic rubber is, when stretched, orientation-crystalized like as in the natural rubber which has been confirmed by the X-ray method and that the copolymer can be reinforced with carbon even when not vulcanized. In view of the foregoings, various new uses are expected in respect of the alternate structure NBR as synthetic rubber not only having a relatively high flexibility or suppleness, considerably high strength and desirable dynamic properties but also being of high oil resistance.

The inventors already proposed a process for the manufacture of dual and plural alternate copolymers in which the mole ratio of the total of electron donor monomers such as conjugated dienes, terminally unsaturated olefinic compounds and vinyl substituted aromatic hydrocarbons to the total of electron acceptor monomers such as acrylonitrile and $\alpha,\beta$-unsaturated carboxilic esters is always 1 to 1 by proceeding with the reaction with photoradiation in the presence of at least one aluminum halide (patent application Ser. No. 884,249 as filed Dec. 11, 1969).

The inventors have further developed the study on these polymerization reactants to find out that the same alternate copolymers can be obtained with satisfactory control of polymerization rate and degree and with satisfiably lesser gel contents in the resulting copolymer by means of using a catalyst system comprising at least one metal halide, said metal belonging to II–A, III–A or IV–A in the Periodic Table and/or at least one organic metal halide and/or at least one organometallic compound, said metal belonging to III–A or IV–A in said table in lieu of the aluminum halide as used in said copending application and with radiation of light; and that using one or more of particular aromatic hydrocarbons, polynuclear hydrocarbons, aromatic halides, heterocyclic compounds, azo compounds, aldehydes, ketones, glyoxals and sulfones in combination with said catalyst constituents can improve the yield of the objective copolymer possibly owing to photosensitizing effect thereof, based on which is this invention.

Namely the invention has an object to improve the yield of the butadiene-acrylonitrile alternate copolymer with lesser gel formation and elevate alternation regularity by carrying out the copolymerization under photoradiation and with using the particular photosensitizer so to call, in addition to the catalyst system as referred to above.

L. C. Little et al. reported that dimerization of butadiene and $\alpha$-acetoxyacrylonitrile under photo-energization by radiating ultraviolet ray increased the ratio of cyclobutane derivative content to cyclohexane derivative content in comparison with the case where the dimerization was carried out with shielding light, and that the yield of the cyclobutane derivatives was variedly affected depending on the minimum triplet energy of the photosensitizer as used (J. Amer. Chem. Soc., 89, 2741 (1967); ibid., 89, 2742 (1967)). Namely butadiene is apt to realize the trans-form triplet state under photo-energization due to the ultraviolet ray radiation and depending on the sensitizer as selected, and consequently the ratio of the cyclobutane derivative content is relatively increased in the dimerized product resulting therefrom.

The invention wherein photoradiation is proceeded with in the presence of the particular sensitizer and catalyst systems so as to efficiently obtain the butadiene-acrylonitrile alternate copolymer in which each butadiene unit is bonded in the trans-1,4 form, however, can never be obvious from the prior art in the photo polymerization field inclusive the disclosure just referred to above. It is to be an unexpectedly wonderful effect that addition of the particular sensitizer system to the polymerization reactants can not only increase the yield of the objective copolymer but also suppress gel formation without adversely affecting on composition and structure of the alternate copolymer.

It has also been found more preferable for lowering gel formation according to this invention to add a third system which might be considered as anti-gelation agent and which comprises at least one of particular aliphatic halogenated hydrocarbons, sulfurated hydrocarbons, aromatic ethylene derivatives and transition metal compounds.

The first system or catalyst system (A) as used in the invention comprises: (1) at least one metal halide of the formula, $M^I X_2$, $M^{II} X_3$ and $M^{III} X_4$, wherein $M^I$, $M^{II}$, and $M^{III}$ represent respectively a metal belonging to Group II-A, III-A and IV-A of the Periodic Table, where $M^I$ represents Be, $M^{II}$ represents Al, Ga, and B and $M^{III}$ represents Si and Sn, X represents a halogen, and/or (2) at least one organic metal halide of the formula, $R_{n'} M^{II} X_{3-n'}$ and $R_{n''} M^{III} X_{4-n''}$ wherein R represents a hydrocarbon residue having 1 to 10 carbon atoms, $M^{II}$ and $M^{III}$ are as set forth above, X represents a halogen atom, $n'$ is an integer of 1 to 3, and $n''$ is an integer of 1 to 3 and organometallic compounds of the formulae: $R_3 M^{II}$ and $R_4 M^{III}$ according to the specific representations set forth above.

The second system or so to call sensitizer system (B) as used in the invention comprises at least one selected from a class consisting of: (1) benzene aromatic hydrocarbons having benzene as basic nucleus and unsubstituted or substituted hydrocarbon residue of 1 to 10 carbon atoms, and halides thereof, (2) polynuclear aromatic hydrocarbons having naphthalene, phenanthrene, anthracene, fluorene, anthraquinone or xanthone as basic nucleus and unsubstituted or substituted hydrocarbon residue of 1 to 10 carbon atoms, and halides thereof, (3) heterocyclic compounds having pyridine, quinoline, isoquinoline or carbazole as basic nucleus and unsubstituted or substituted hydrocarbon residue of 1 to 10 carbon atoms, and aromatic or aliphatic azoic hydrocarbon compounds, (4) ketone, glyoxal and aldehyde compounds of the general formulae,

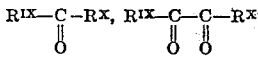

wherein $R^{IX}$ and $R^X$ represent substituted or unsubstituted hydrocarbon residue having 1 to 10 carbon atoms, and

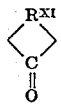

wherein $R^{XI}$ represents a substituted or unsubstituted hydrocarbon residue having 1 to 10 carbon atoms, and (5) sulfonic compounds of the general formula,

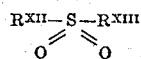

wherein $R^{XII}$ and $R^{XIII}$ represent a substituted or unsubstituted hydrocarbon residue having 1 to 10 carbon atoms, and of the general formula,

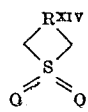

wherein $R^{XIV}$ represents substituted or unsubstituted hydrocarbon residue having 1 to 10 carbon atoms.

The invention provides a process for the manufacture of butadiene-acrylonitrile alternating copolymers in which the mole ratio of the butadiene unit to the acrylonitrile unit is always 1 to 1 characterized by radiating light to the polymerization reactants consisting of said catalyst system (A) in addition to butadiene and acrylonitrile in the presence of said photosensitizer system (B), except the combination of the catalyst system (A) consisting of aluminum halide only with the sensitizer system (B)–(1) or (2) containing no halogen as residue.

According to another aspect of the invention, the same structure copolymer is manufactured by using the third system or so called antigelling agent system (C) in addition to the catalyst system (A) and the sensitizer system (B), said system (C) comprises at least one compound selected from a class consisting of; (1) substituted or unsubstituted aliphatic halogenated hydrocarbons, saturated or unsaturated alicyclic halogenated hydrocarbons and iodine, (2) sulfide or disulfide hydrocarbons of the general formulae, $R^{XV}$—S—$R^{XVI}$ and $R^{XV}$—S—S—$R^{XVI}$ wherein $R^{XV}$ and $R^{XVI}$ represent substituted or unsubstituted hydrocarbon residue having 1 to 10 carbon atoms, and thiol or dithiol hydrocarbons of the general formulae, $R^{XVII}$—SH and HS—$R^{XVIII}$—SH wherein $R^{XVII}$ and $R^{XVIII}$ represent substituted or unsubstituted hydrocarbon residue having 1 to 10 carbon atoms, (3) aromatic ethylenic hydrocarbons of the general formula,

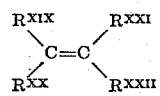

wherein $R^{XIX}$, $R^{XX}$, $R^{XXI}$ and $R^{XXII}$ represent substituted or unsubstituted hydrocarbon residue having 1 to 10 carbon atoms, and (4) transition metal belongs to Group IV-B, V-B, VI-B, VII-B or VIII of the Periodic Table, having at least one of halogen atom, alkoxy, β-diketo and acyloxy groups.

Among compounds to be used in the invention as constituent of (A)–(1) catalyst system are; beryllium dichloride, beryllium dibromide, aluminum trichloride, aluminum trbromide, boron trichloride, boron tribromide, gallium trichloride, gallium tribromide, silicon tetrachloride, silicon tetrabromide, germanium tetrachloride, tin tetrachloride, tin tetrabromide etc. As constituent of (A)–(3) catalyst system, there are illustrated methylaluminum dichloride, ethylaluminum dichloride, phenylaluminum dichloride, methylaluminum dibromide, ethylaluminum dibromide, dimethylaluminum chloride, diethylaluminum chloride, diphenylaluminum chloride, dicyclohexylaluminum chloride, dimethylaluminum bromide, diethylaluminum bromide, ethylaluminum sesquichloride, ethylaluminum sesquibromide, triethylaluminum, triphenylaluminum, tribenzylaluminum, methylboron dichloride, ethylboron dichloride, phenylboron dichloride, benzylboron dichloride, diethylboron bromide, triethylboron, diethylphenylboron methylsilicon trichloride, dimethylsilicon dichloride, trimethylsilicon chloride, tetramethylsilicon, tetraphenylsilicon, ethyltin, trichloride, phenyltin, trichloride, diethyltin dichloride, dimethyltin dibromide, trimethyltin chloride etc.

It is possible according to the invention to use at least one metal halide compound or organic metal halide compound as catalyst constituent to be selected from either of said groups (A)–(1), (2) and (3), but it is preferable in order to obtain more efficiently the alternating copolymer with lesser gel content to use the combination of at least one metal halide compound and at least one organic metal halide compound selected respectively from said two groups (A)–(1) and (2). The combination shall be illustrated; aluminum trichloride/diethylaluminum chloride, aluminum trichloride/methylsilicon trichloride, aluminum tribromide/ethylaluminum dichloride, aluminum tribromide/methylsilicon trichloride etc.

Among compounds to be used in the invention as constituent, benzene aromatic hydrocarbons and halides thereof (1) of the photosensitizer system (B) are; ortho-xylene, meta-xylene, para-xylene, durene, ethylbenzene, chlorobenzene, ortho - dichlorobenzene, bromobenzene, para-dibromobenzene, benzene iodide, para-diiodinated benzene diphenyl, meta-diphenylbenzene, para-diphenylbenzene, diphenylmethane, Tetralin, etc. As for polynuclear aromatic compounds and halides thereof (2) of the sensitizer (B) there are illustrated; naphthalene, α-methylnaphthalene, β - methylnaphthalene, α - chloronaphthalene, β-chloronaphthalene, α-bromonaphthalene, phenanthrene, triphenylene, pyrene, perrilene, anthracene, 9,10-dibromoanthracene, fluoroene, anthraquinone, xanthone, etc. Among heterocyclic compounds and azoic hydrocarbons of (B)–(3) are; quinoline, 2,4-dimethylquinoline, carbazole, N-ethylcarbazole, N-vinylcarbazole, 2,2'-bipyridine, 1,2-di(4-pyridyl)-ethylene, ortho - phenanthroline, azobenzene, azobisisobutyronitrile etc. For ketone, glyoxal and aldehyde compounds of (B)–(4) the followings are given by way of examples; acetone, acetophenone, benzophenone, cyclohexanone, α-naphthylmethylketone, β - naphthylmethylketone, α - naphthylphenylketone, β-naphthylphenylketone, diacetylbenzyl, benzaldehyde, 1-naphthoaldehyde etc. Among sulfonic compounds of (B)–(5) there are; sulfolane, diphenylsulfone, etc.

It is possible according to the invention to use at least one selected from the class consisting of compounds of (B)–(1) to (5) as sensitizer, but it is often preferable to use two or more of them in combination in order to obtain the alternate copolymer in the higher yield and with lesser gel content. The combination may be illustrated as Tetralin, quinoline, Tetralin/anthracene, etc.

As halogen in the halogenated hydrocarbons of (C)–(1) for antigelling to be used in the invention as occasion demands, bromine and iodine are preferable, which shall be enumerated by way of example as follows; methane dibromide, bromoform, methane tetrabromide, methane diiodide, iodoform, ethylene tetrabromide, ethylene tetraiodide, allyl bromide, allyl iodide, ethyl bromide, butyl bromide, ethyl iodide, butyl iodide, etc. Among hydrocarbons of sulfide, disulfide and thiol of (C)–(2) are; diethyl sulfide, dibenzyl sulfide, dibenzyl disulfide, ethylene diol, thiophene, etc. As for aromatic ethylenic hydrocarbons of (C)–(3) for antigelling, the following are exemplarily enumerated; 1,1-diphenylethylene, 1,2-diphenylethylene 1,1,2,2-tetraphenylethylene, trans-stilbene, etc. As transition metal compound of (C)–(4) for antigelling agents, titanium, vanadium, chromium, manganese, iron and cobalt compounds soluble to the polymerization reactants are preferable, among which are; titanium tetrachloride, vanadyl trichloride, vanadylethoxy dichloride, vanadyldiacetyl acetonate, chromium trichloride, chromium trisacetylacetonate, iron trichloride, salicylaldehyde cobalt, etc.

The light to be radiated for proceeding with the invention is generally of the wave length of 2,000 to 6,000 angstroms, and more preferably ultraviolet ray of the wave length in the range of 2,000 to 4,000 angstroms is utilized. As for the light source there is no particular limitation, and for instance a mercury lamp, sodium lamp, xenon lamp or natural sun light is used through a suitable filter. No particular limitation is taken into consideration as to the method for radiating light to the polymerization reactants. The photoradiation can be carried out with leaving the reactant system standing still, or with subjecting the same to the flowing state for instance by rotating the vessel, stirring or agitating.

The method for charging the monomers as material to be copolymerized is also optional. The ratio of the two monomers would slightly affect on the yield, polymerization degree, physical properties of the products and the like. Depending on the purpose or use, the ratio may be determined. The mole ratio of butadiene to acrylonitrile lies generally in the range of 20/1 to 1/20, and more preferably from 1/8 to 8/1.

The amount of the catalyst system (A) to be used for carrying out the invention may be varied depending on the object or use. It does affect on the yield, polymerization degree and gel content but not on the composition and structure. In general the catalyst amount would not exceed the amount of acrylonitrile, and preferably lies in the range of $1/10^6$ to $1/2$ mole in relation to 1 mole of the total monomers as charged. In the other viewpoint 1/10 mole or less is sufficient in relation to 1 mole of acrylonitrile. As to the photosensitizer (B) it is sufficient to use in the amount of $1/10^{10}$ to $1/4$ mole in relation to 1 mole of the total monomers as charged and $1/10^4$ to $1/2$ mole in relation to 1 mole of the catalyst system (A) as added. Among the sensitizers of (B)–(1) and (2) the compounds being liquid at the polymerization temperature can be used also as solvent for the polymerization reactants. So far as the sensitizers of (B)–(3) to (5) are concerned, it is not preferable to use in excess of the amount range as referred to above. When the antigelling agent system of Group (C) is used, the amount of $1/10^{10}$ to $1/4$ mole in relation to 1 mole of the total monomers as charged and of $1/10^4$ to $1/2$ mole in relation to 1 mole of the catalyst system (A) as used is sufficient.

The order of adding-mixing the monomers, the catalyst system, the photosensitizer system and the gelation preventing agent system is left to option, but it is preferable firstly to add the catalyst system (A) to acrylonitrile to be complexed, then to add thereto the sensitizer system (B), the antigelling agent system (C) and butadiene in this order to which the photoradiation is carried out. The temperature at which the addition-mixture is proceeded with is in general of −78° to 30° C., but there is no particular limitation.

The polymerization temperature can be in the range of −100° to 100° C., but generally the range of −80° to 80° C. and more particularly −30° to 40° C. is preferable. The polymerization pressure is in the range from such as generally determined by the vapor pressure of the polymerization reactant to around 150 atm., but there is no particular limitation also in this respect. The reaction is carried out in such atmosphere as not preventing the copolymerization, for instance in the monomer vapor or nitrogen gas.

The reaction can be proceeded with according to the so-called bulk polymerization, namely in the liquid monomers without using any solvent. In this case it is preferable to prepare the polymerization reactant in which acrylonitrile content is relatively higher. Of course usual inert solvent can be used so far as it will not prevent the copolymerization. It is also possible to use any of the sensitizers belonging to said groups (B)–(1) and (2), which is in liquid state at the polymerization temperature as solvent as referred to above. The usual inert solvents as said above may be aliphatic hydrocarbons, alicyclic compounds, aromatic hydrocarbons except those as belonging to the sensitizer (B)–(1) and (2), as well as halides thereof. For instance propane, butane, pentane, hexane, cyclohexane, dichloromethane, chloroform, tetrachloromethane and mixtures thereof are used. After completion of the copolymerization the conventional after-treatments are taken and the resulting copolymer is purified to recover. For that purpose any of the so-called alcohol treatment, alcohol hydrochloric acid treatment, aqueous hydrochloric acid treatment or the like, is applied. For instance after adding and mixing N - phenyl - β - naphthylamine as antioxidant, the copolymer solution is mixed in an excess amount of methanol/hydrochloric acid or dropped into boiled water to evaporate the unreacted monomers, solvent etc., and to elute the catalyst residue for separating the copolymer which is then subjected to drying in vacuo at 50° C.

The invention shall be more definitely and minutely explained in the following examples which are given merely for the purpose of explanation but not for restricting the invention to these cases.

EXAMPLE 1

1.5 mmole of anhydrous aluminum trichloride as 1 mole/l. solution of acrylonitrile, 0.5 mmole of diethylaluminum chloride as 1 mole/l. solution of n-hexane and for the photosensitizer each 0.1 mmole of quinoline, acetone, acetophenone, benzophenone, β - naphthyl-methylketone, sulfolane and diphenylsulfone as 0.1 mole/l. solution of acrylonitrile were respectively added at room temperature to the distillated and purified 449 mmole of acrylonitrile in a 100 ml. polymerization flask with 4 m./m. thickness, made of Pyrex glass, the inside of which was well dried and replaced by nitrogen gas. Then, after cooling said solution at —78° C. using a cooling agent of Dry Ice/acetone, 100 mmole of purified and dewatered liquid butadiene was added to the solution in said flask which was then sealed. The photosensitized polymerization reaction, was carried out in stationary condition at a distance of 2 cm. from the high pressure mercury lamp, UM–103B (100 w.) by Ushio Electric Co. (Tokyo) which was equipped in the water cooling jacket. Temperature for polymerization was 23~29° C. After 2 hours of photoradiation treatment, said polymerization flask was opened and the content therein was mixed into about 250 ml. of methanol containing about 1 wt. percent of N-phenyl-β-naphthylamine as the antioxidant agent and then, the precipitate of copolymer was isolated from said methanol. After drying in vacuo said formed copolymer, yields were calcuated against the theorectical value on the assumption of getting perfect alternate copolymer. Rubber like elastomers were obtained in 12.8, 18.4, 31.5, 32.1, 44.1, 19.7 and 21.5% yields respectively according to the photosensitizers as used in the order referred to above. Without addition of the photosensitizer, yield was only 6.3% under the same hours of radiation.

EXAMPLE 2

In the same manner as in Example 1 except the addition of each 1.0 mmole of naphthalene, α-chloronaphthalene and anthracene as 0.1 mole/l. solution of acrylonitrile for the photosensitizer, rubber-like elastomers were obtained in 20.5, 22.7 and 38.7% yields respectively under 2 hours of radiation.

EXAMPLE 3

In the same manner as in Example 1 except the addition of 0.1 mmole of quinoline as 0.1 mole/l. solution of toluene for the photosensitizer, a rubber-like elastomer was obtained in 23.8% yield under 1 hour of radiation.

EXAMPLE 4

In the same manner as in Example 1 except the addition of each 1.0 mmole of α-chloronaphthalene, meta-diphenylbenzene and carbazole as 1 mole/l. solution of acrylonitrile for the photosensitizer, rubber-like elastomers were obtained in 29.1, 15.1 and 17.7% yields respectively under 1 hour of radiation.

EXAMPLE 5

In the same manner as in Example 1 except the addition of each 1.0 mmole of benzene iodide and para-benzene diiodide as 1 mole/l. solution of acrylonitrile for the photosensitizer, rubber-like elastomers without gel content were obtained in 19.8 and 11.2% yields respectively under 3 hours of radiation.

EXAMPLE 6

In the same manner as in Example 1, 2 mmole of diethylaluminum chloride as 2.0 mole/l. solution of n-hexane, 1 mmole of naphthalene as 0.2 mole/l. solution of n-hexane and 1 mmole of azobisiobutylonitrile as 0.2 mole/l. solution of toluene for the photosensitizer were added in this sequence to 776 mmole of acrylonitrile and 100 mmole of butadiene. A rubber-like elastomer without gel content was obtained in 14.9% yield under 2 hours of radiation. In the case of using diethylaluminum chloride only, a rubber-like elastomer was obtained in 1.9% yield under the same condition as above.

EXAMPLE 7

By using ethylaluminum chloride instead of diethylaluminum dichloride as shown in Example 6, a rubber-like elastomer without any gel content was obtained in 20.5% yield. On the other hand, in the case of using ethylaluminum dichloride only, without photosensitizers a rubber-like elastomer was obtained in 4.7% yield under the same condition as above.

EXAMPLE 8

In the same manner as in Example 1, 200 mmole of butadiene and acrylonitrile in total and 1 mmole of naphthalene as 0.2 mole/l. solution of n-hexane for the photosensitizers were fixed and then 2 mmole of tin tetrachloride of 1 mole/l. solution of acrylonitrile was added to said butadiene and acrylonitrile. Said mixture of butadiene and acrylonitrile (200 mmole) having 21.88, 56.60 and 91.32 mole percent of acrylonitrile content respectively were polymerized under 1 hour of radiation, rubber-like elastomers were obtained in 16.0, 10.6 and 5.4% yield respectively. The contents of acrylonitrile in said copolymers calculating by the values of the elemental analysis were 46.77, 47.80 and 51.61 mole percent respectively. Regardless of the feeding ratio of acrylonitrile to butadiene, it was confirmed that the alternating copolymer in which the composition of unit between butadiene and acrylonitrile was 1:1 (mole ratio), was obtained.

EXAMPLE 9

In the same manner as in Example 1, 2 mmole of silicone tetrachloride as 0.5 mole/l. solution of acrylonitrile and 1 mmole of naphthalene as 0.2 mole/l. solution of n-hexane for the photosensitizer were added to 776 mmole of acrylonitrile and 100 mmole of butadiene. A rubber-like elastomer without gel content was obtained in 11.5% yield under 2 hours of radiation. This copolymer was dissolved in chloroform, reprecipitated and purified by methanol, and then dried in vacuum condition. The elemental analysis showed, C: 74.20, H: 8.24 and N: 12.6%, which corresponded to 50.94 mole percent of acrylonitrile content, whereby said formed copolymer was confirmed to be of the alternating structure.

EXAMPLE 10

In the case of using 2 mmole of gallium trichloride as catalyst instead of silicon tetrachloride as in Example 9, a rubber-like elastomer without gel content was obtained in 5.9% yield. By the result of the elemental analysis, it was confirmed that the elastomer was an alternating copolymer having 50.41 mole percent acrylonitrile content.

EXAMPLE 11

In the case of using 2 mmole of beryllium dichloride as catalyst instead of silicon tetrachloride as in Example 9, a rubber-like elastomer without gel content was obtained in 5.6% yield.

EXAMPLE 12

Instead of silicon tetrachloride as in Example 9, 5 mmole of boron trifluoride (40% solution of acetic acid), 2 mmole of boron trichloride, or 2 mmole of boron tribromide was used. Rubber-like elastomers were obtained in 7.8, 9.7 and 22.7% yields respectively.

EXAMPLE 13

In the same manner as in Example 1, the polymerization flask containing the same polymerization reaction system was subjected to the photo polymerization in rotating condition at a distance of 15 cm. from the high pressure mercury lamp, UM–1207B (1200 w.) by Ushio Electric Co. (Tokyo), equipped in the water cooling jacket, instead of the radiation apparatus as shown in Example 1. Temperature for polymerization was about 40° C. 2 mmole of ethylaluminum sesquichloride as 1 mole/l. solution of n-hexane and 14.6 ml. of tetralin for the photosensitizer were added to 449 mmole of acrylonitrile, and after polymerization flask was cooled down to −78° C., 100 mmole of butadiene was added into said flask and then radiated during 1 hour. A rubber-like elastomer without gel content was obtained in 6.9% yield. Without using Tetralin, a rubber-like elastomer without gel content was obtained in 2.3% yield under 1.5 hours of radiation.

EXAMPLE 14

In the same manner as in Example 13, 2 mmole of aluminum tribromide as 1 mole/l. solution of acrylonitrile was added as catalyst. A rubber-like elastomer with 18.6% gel content was obtained in 73.4% yield under 3 hours of radiation.

EXAMPLE 15

In the same manner as in Example 13, 1 mmole of aluminum tribromide and 1 mmole of tin tetrachloride were added as catalyst and then 14.6 ml. of tetralin was added as the photosensitizer. A rubber-like elastomer with 8.6% gel content was obtained in 24.3% yield under 3 hours of radiation. Furthermore, in the case of addition of 1 mmole of anthracene as 1 mole/l. solution of tetralin to the said polymerization reaction system, a rubber-like elastomer with 14.0% gel content was obtained in 27.2% yield under 3 hours of radiation.

EXAMPLE 16

In the same manner as in Example 13, 1 mmole of aluminum tribromide and 1 mmole of ethyltin trichloride were added and then 14.6 ml. of tetralin was added as the photosensitizer. A rubber-like elastomer with 13.1% gel content was obtained in 26.4% yield under 3 hours of radiation. In the case of addition of 1 mmole of anthracene to said polymerization reaction system as the photosensitizer, a rubber-like elastomer with 13.6% gel content was obtained in 30% yield under 3 hours of radiation.

EXAMPLE 17

In the same manner as in Example 13, 2 mmole of methyltin trichloride was added, and then 14.6 ml. of Tetralin was added as the photosensitizer. A rubber-like elastomer without gel content was obtained in 7.9% yield under 3 hours of radiation. In the case where 1 mmole of anthracene was added to said polymerization reaction system, a rubber-like elastomer without gel content was obtained in 9.4% yield under 3 hours of radiation.

EXAMPLE 18

2 mmole of anhydrous aluminum trichloride as 2 mole/l. solution of acrylonitrile, 1 mmole of naphthalene as 0.2 mmole solution of n-hexane and 1 mmole of methane tetrabromide of 0.5 mole/l. solution of toluene were added, in this sequence, at room temperature to 776 mmole of distillated and purified acrylonitrile in a 100 ml. polymerization flask with 4 m./m. thickness made of Pyrex glass the inside of which was well dried and replaced by nitrogen gas. Then, said solution was cooled down to at −78° C. by the cooling agent of Dry Ice/acetone and after adding 100 mmole of purified and dewatered liquid butadiene to said solution, the polymerization flask was sealed. Said polymerization flask was subjected to photo polymerization during 2 hours, in stationary condition at the distance of 2 cm. from the high pressure mercury lamp, UM–103B (100 w.) by Ushio Electric Co. (Tokyo), as equipped with a water cooling jacket. Temperature for polymerization was 22~26° C. After said treatment, the polymerization flask was opened and said content was mixed into about 250 ml. of methanol in which about 1 wt. percent of N-phenyl β-naphthylamine was contained as an antioxidant agent, then, the precipitate of said copolymer was isolated from said solution. Said formed copolymer was dissolved in chloroform, and dried in vacuo after reprecipitated and purified with methanol. The yield was 22.4%, which was calculated against the theoretical value on the assumption of getting perfect alternate copolymer. This copolymer was a rubber-like elastomer that was completely soluble in chloroform (i.e. without gel content).

EXAMPLE 19

In the same manner as in Example 18, 1 mmole of dibenzyl disulfide as 0.5 mole/l. solution of toluene was used instead of methane tetrabromide. A rubber-like elastomer without gel content was obtained in 21.5% yield. For reference, in the same condition as shown in this example, a copolymer with 85% gel content was obtained in 30% yield in the case of using aluminum trichloride only without using the antigelling agent.

EXAMPLE 20

In the same manner as in Example 18, 1 mmole of bromoform as 0.5 mole/l. solution of n-hexane was used instead of methane tetrabromide. A rubber-like elastomer without gel content was obtained in 16.8% yield.

EXAMPLE 21

In the same manner as in Example 18, 2 mmole of aluminum trichloride as 1 mole/l. solution of acrylonitrile, 1 mmole of naphthalene as 0.2 mole/l. solution of n-hexane and 0.1 mmole of iodoform as 0.1 mole/l. solution of toluene were added to 449 mmole of acrylonitrile and 100 mmole of butadiene. A rubber-like elastomer with 3.7% gel content was obtained in 12.3% yield after 2 hours of radiation.

EXAMPLE 22

In the same manner as in Example 18, 0.1 mmole of iodine as 0.1 mole/l. solution of toluene was added instead of iodoform as shown in Example 21. A rubber-like elastomer without gel content was obtained in 24.0% yield, after 3 hours of radiation.

EXAMPLE 23

In the same manner as in Example 18, 0.1 mmole of ethyliodide as 0.1 mole/l. solution of toluene instead of iodoform as shown in Example 21 was used. A rubber-like elastomer without gel content was obtained in 15.5% yield after 2 hours of radiation. The intrinsic viscosity [$\eta$] of said elastomer was 2.73. As the result of structural analysis by nuclear magnetic resonance absorption spectrum (100/mHz.) in deuterated chloroform, it was confirmed that the bond ratio of acrylonitrile-butadiene was 88.7%, the bond ratio of acrylonitrile-acrylonitrile was 8.0% and bond ratio of butadiene-butadiene was 3.3%, and therefore, it was confirmed that the product was the copolymer of the alternating structure in which the mole ratio between acrylonitrile and butadiene was substantially of 1 to 1.

EXAMPLE 24

In the same manner as in Example 18, 0.1 mmole of thiophene as 0.1 mole/l. solution of toluene was added instead of iodoform as shown in Example 21. A rubber-like elastomer without gel content was obtained in 17.9% yield under 3 hours of radiation. The intrinsic viscosity [$\eta$] was 0.66. As the result of structural analysis by nuclear magnetic resonance absorption spectrum (100/mHz.) in deuterated chloroform, it was confirmed that the bond ratio of acrylonitrile-butadiene was 87.6%, the bond ratio of acrylonitrile-acrylonitrile was 9.5% and the bond ratio of butadiene-butadiene was 2.9%. Thus it was confirmed that the copolymer was of alternating structure in which the mole ratio of acrylonitrile to butadiene was substantially 1 to 1. For reference, in the same condition as shown in this example, copolymer with 84.0% gel content was obtained in 7.3% yield in the case of using aluminum trichloride only without antigelling agent.

EXAMPLE 25

In the same manner as in Example 18, 2 mmole of aluminum trichloride as 1 mole/l. solution of acrylonitrile, 1 mmole of naphthalene as 0.2 mole/l. solution of n-hexane and each 1 mmole of 1,1-diphenylethylene and trans-stilbene as the antigelling agent were added to 449 mmole ofacrylonitrile and 100 mmole of butadiene. Rubber-like elastomers with 5.9 and 17.2% gel content were obtained in 9.5 and 10.3% yields respectively under 1 hour of radiation. For reference, under the same condition as shown in this working example, a copolymer with 90.8% gel content was obtained in 5.8% yield without using the antigelling agent.

In the same manner as in Example 18, 2 mmole of ethylaluminum dichloride as 1 mole/l. solution of n-hexane, 0.5 mmole of vanadyl trichloride as 1 mole/l. solution of n-hexane and 1 mmole of naphthalene as 0.2 mole/l. solution of n-hexane were added in this sequence at room temperature to 449 mmole of acrylonitrile. After the polymerization flask was cooled down to −78° C., 100 mmole of liquid butadiene was added to the reactants in said flask. A rubber-like elastomer without gel content was obtained in 28.0% yield under 2 hours of radiation. For reference, under the same condition as shown in this example, a rubber-like elastomer without gel content was obtained in 9.4% yield, in the absence of naphthalene.

What we claim is:

1. A process for the manufacture of an alternating copolymer of butadiene and acrylonitrile having a constant 1:1 ratio of the butadiene and acrylonitrile units which comprises the steps of irradiating, by electromagnetic radiation in the wavelength range of 2000 to 6000 angstrom units, butadiene and acrylonitrile in the presence of a catalyst (A) and a sensitizer (B); wherein said catalyst (A) comprises at least one compound selected from (1) the group of organometallic halides of the formulae $R_n \cdot M^{II} X_{3-n} \cdot R_{n'} \cdot M^{III} X_{4-n''}$; wherein R represents a hydrocarbon residue having 1 to 10 carbon atoms; $M^{II}$ is Al, Ga or B, $M^{III}$ is Si or Sn and X is a halogen; $n'$ is an integer of 1 or 2; and $n''$ is an integer of 1 to 3 and (2) the group of organometallic compounds of the general formula $R_3 M^{II}$, $R_4 M^{III}$ wherein R, $M^{II}$ and $M^{III}$ are as indicated above and wherein said sensitizer (B) consists of at least one compound selected from the group consisting of (1) benzene aromatic hydrocarbons having benzene as basic nucleus and an unsubstituted or substituted hydrocarbon residue of 1 to 10 carbon atoms, and halides thereof, (2) polynuclear aromatic hydrocarbons having naphthalene, phenanthrene, anthracene, fluorene, anthraquinone or xanthone as basic nucleus and an unsubstituted or substituted hydrocarbon residue of 1 to 10 carbon atoms, and halides thereof, (3) heterocyclic compounds having pyridine, quinoline, isoquinoline or carbazole as basic nucleus and an unsubstituted or substituted hydrocarbon residue of 1 to 10 carbon atoms, and aromatic or aliphatic azoic hydrocarbon compounds, (4) ketone, glyoxal and aldehyde compounds of the general formulae,

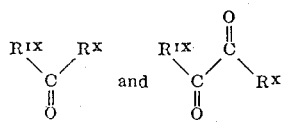

wherein $R^{IX}$ and $R^{X}$ represent an unsubstituted or substituted hydrocarbon residue having 1 to 10 carbon atoms, and of the general formula,

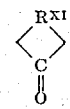

wherein $R^{XI}$ represents an unsubstituted or substituted hydrocarbon residue having 1 to 10 carbon atoms, and (5) sulfonic compounds of the general formula,

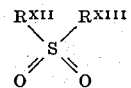

wherein $R^{XII}$ and $R^{XIII}$ represent an unsubstituted or substituted hydrocarbon residue having 1 to 10 carbon atoms, and of the general formulae,

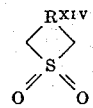

wherein $R^{XIV}$ represents an unsubstituted or substituted hydrocarbon residue having 1 to 10 carbon atoms.

2. Process as claimed in claim 1 in which said catalyst system (A) is used in the form of a complex with acrylonitrile.

3. process as claimed in claim 1 in which butadiene and acrylonitrile monomers are used in the mole ratio of 20/1 to 1/20.

4. Process as claimed in claim 1 in which said catalyst system (A) is used in the amount of $1/10^6$ to 1/2 mole in relation to 1 mole of the total monomers as charged.

5. Process as claimed in claim 1 in which said photosensitizer system (B) is used in the amount of $1/10^{10}$ to 1/4 mole in relation to 1 mole of the total monomers as charged and of $1/10^4$ to 1/2 mole in relation to 1 mole of the catalyst system (A) as used.

6. Process as claimed in claim 1 in which the catalyst system (A) comprises at least one selected from a group consisting of diethylaluminum chloride, ethylaluminum dichloride, ethylaluminum sesquichloride, and ethyltin trichloride.

7. Process as claimed in claim 1 in which the photosensitizer system (B) comprises two or more compounds in combination.

8. Process as claimed in claim 7 in which the photosensitizer system (B) is any one of the combinations of Tetralin, anthracene, naphthalene, and azobisisobutylonitrile.

9. Process as claimed in claim 1 in which in addition an antigelling agent (C) is present comprising at least one compound selected from a group consisting of (1) unsaturated or saturated aliphatic halogenated hydrocarbons, unsaturated or saturated alicyclic halogenated hydrocarbons and iodine, (2) sulfide or disulfide hydrocarbons of the general formulae, $R^{XV}$—S—$R^{XVI}$ and $R^{XV}$—S—S—$R^{XVI}$ wherein $R^{XV}$ and $R^{XVI}$ represent an unsubstituted or substituted hydrocarbon residue having 1 to 10 carbon atoms, and thiol or dithiol hydrocarbons of the general formulae, $R^{XVII}$—SH and HS—$R^{XVIII}$—SH wherein $R^{XVII}$ and $R^{XVIII}$ represent an unsubstituted or substituted hydrocarbon residue having 1 to 10 carbon atoms, (3) aromatic ethylenic hydrocarbons of the general formulae,

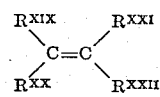

wherein $R^{XIX}$, $R^{XX}$, $R^{XXI}$ and $R^{XXII}$ represent an unsubstituted or substituted hydrocarbon residue having 1 to 10 carbon atoms, and (4) transition metal compounds of metals belonging to Group IV–B, V–B, VI–B, VII–B or VIII in the Periodic Table and having at least one of halogen atom, alkoxy, β-diketo and acyloxy groups.

10. Process as claimed in claim 9 in which the anti-gelling agent system (C) is used in the amount of $1/10^{10}$ to 1/4 mole in relation to 1 mole of the total monomers as charged and of $1/10^4$ to 1/2 mole in relation to 1 mole of the catalyst system (A).

11. Process as claimed in claim 9 in which the anti-gelling agent system (C) comprises at least one compound selected from a group consisting of methane tetrabromide, dibenzylsulfide, bromoform, iodoform, iodine, ethyl iodide, thiophene, 1,1-diphenylethylene, trans-stilbene and vanadyl trichloride.

12. A process for the manufacture of an alternating copolymer of butadiene and acrylonitrile which comprises the steps of irradiating, by electromagnetic radiation in the wavelength range of 2000 to 6000 angstrom units, butadiene and acrylonitrile in the presence of a catalyst (A) and an additional sensitizer (B); wherein said catalyst (A) comprises at least one compound selected from (1) the group of organometallic halides of the formulae $R_{n'}M^{II}X_{3-n'}R_{n''}M^{III}X_{4-n''}$; wherein R represents a hydrocarbon residue having 1 to 10 carbon atoms; $M^{II}$ is Al, Ga, or B, $M^{III}$ is Si or Sn; $n'$ is an integer of 1 or 2; and $n''$ is an integer of 1 to 3; and (2) the group of organometallic compounds of the general formula $$R_3M^{II}/R_4M^{III}$$

wherein R, $M^{II}$ and $M^{III}$ are as indicated above.

13. Process as claimed in claim 12 in which the photosensitizer system (B) comprises at least one compound selected from the group consisting of quinoline, acetone, acetophenone, benzophenone, β-naphthylmethyl ketone, sulfolane, diphenylsulfone, naphthalene, α-chloronaphthalene, anthracene, meta-diphenylbenzene, carbazole, benzene iodide, para-diiodinated benzene, azobisisobutylonitrile and Tetralin.

14. A process for the manufacture of an alternating copolymer of butadiene and acrylonitrile having a constant 1:1 ratio of the butadiene and acrylonitrile units which comprises the steps of irradiating, by electromagnetic radiation in the wavelength range of 2000 to 6000 angstrom units, butadiene and acrylonitrile in the presence of a catalyst (A) and a sensitizer (B); wherein said catalyst (A) comprises at least one compound selected from (1) the group of organometallic halides of the formulae $R_{n'}M^{II}X_{3-n'}R_{n''}M^{III}X_{4-n''}$: wherein R represents a hydrocarbon residue having 1 to 10 carbon atoms; $M^{II}$ is Al, Ga, or B, $M^{III}$ is Si or Sn and X is a halogen; $n'$ is an integer of 1 or 2; and $n''$ is an integer of 1 to 3 and (2) the group of organometallic compounds of the general formula $R_3M^{II}$, $R_4M^{III}$ wherein R, $M^{II}$ and $M^{III}$ are as indicated above and wherein said sensitizer (B) consists of at least one compound selected from the group consisting of m-diphenylbenzene, p-diphenylbenzene, benzene iodide, benzene chloride, benzene bromide, p-benzene diiodide, o-benzene dichloride, p-benzene dibromide, Tetralin, naphthalene, α-methylnaphthalene, β-methylnaphthalene, α-chloronaphthalene, β-chloronaphthalene, α-bromonaphthalene, anthracene, quinoline, 2,4-dimethylquinoline, carbazole, N-ethylcarbazole, azobisisobutylonitrile, acetone, acetophenone, benzophenone, α-naphthylmethyl ketone, β-naphthylmethyl ketone, sulfolane and diphenylsulfone.

15. A process for the manufacture of an alternating copolymer of butadiene and acrylonitrile having a constant 1:1 ratio of the butadiene and acrylonitrile units which comprises the steps of irradiating, by electromagnetic radiation in the wavelength range of 2000 to 6000 angstrom units, butadiene and acrylonitrile in the presence of a catalyst (A) and a sensitizer (B); wherein said catalyst (A) comprises at least one compound selected from (1) the group of organometallic halides of the formula $R_{n'}M^{II}X_{3-n'}R_{n''}M^{III}X_{4-n''}$; wherein R represents a hydrocarbon residue having 1 to 10 carbon atoms; $M^{II}$ is Al, Ga, or B, $M^{III}$ is Si or Sn and X is a halogen; $n'$ is an integer of 1 or 2; and $n''$ is an integer of 1 to 3 and (2) the group or organometallic compounds of the general formula $R_3M^{II}$, $R_4M^{III}$ wherein R, $M^{II}$ and $M^{III}$ are as indicated above and wherein said sensitizer (B) consists of at least one compound selected from the group consisting of polynuclear aromatic hydrocarbons having naphthalene, phenanthrene, anthracene, fluorene, anthraquinone or xanthone as basic nucleus and an unsubstituted or substituted hydrocarbon residue of 1 to 10 carbon atoms, and halides thereof.

16. A process as claimed in claim 15 wherein said sensitizer comprises a naphthalene.

17. A process as claimed in claim 15 wherein said sensitizer comprises anthracene.

18. A process for the manufacture of an alternating copolymer of butadiene and acrylonitrile having a constant 1:1 ratio of the butadiene and acrylonitrile units which comprises the steps of irradiating, by electromagnetic radiation in the wavelength range of 2000 to 6000 angstrom units, butadiene and acrylonitrile in the presence of a catalyst (A) and a sensitizer (B); wherein said catalyst (A) comprises at least one compound selected from (1) the group of organometallic halides of the formulae $R_{n'}M^{II}X_{3-n'}R_{n''}M^{III}X_{4-n''}$; wherein R represents a hydrocarbon residue having 1 to 10 carbon atoms; $M^{II}$ is Al, Ga or B, $M^{III}$ is Si or Sn and X is a halogen; $n'$ is an integer of 1 or 2; and $n''$ is an integer of 1 to 3 and (2) the group of organometallic compounds of the general formula $R_3M^{II}$, $R_4M^{III}$ wherein R, $M^{II}$ and $M^{III}$ are as indicated above and wherein said sensitizer (B) consists of at least one compound selected from the group consisting of m-diphenylbenzene, p-diphenylbenzene, benzene iodide, p-benzene diiodide, Tetralin, naphthalene, α-chloronaphthalene, anthracene, quinoline, carbazole, azobisisobutylonitrile, acetone, acetophenone, benzophenone, β-naphthylmethyl ketone, sulfolane, diphenylsulfone.

19. A process for the manufacture of an alternating copolymer of butadiene and acrylonitrile having a constant 1:1 ratio of the butadiene and acrylonitrile units which comprises the steps of irradiating, by electromagnetic radiation in the wavelength range of 2000 to 6000 angstrom units, butadiene and acrylonitrile in the presence of a catalyst (A) and a sensitizer (B); wherein said catalyst (A) comprises at least one compound selected from (1) the group of organometallic halides of the formulae $R_{n'}M^{II}X_{3-n'}R_{n''}M^{III}X_{4-n''}$; wherein R represents a hydrocarbon residue having 1 to 10 carbon atoms; $M^{II}$ is Al, Ga, or B, $M^{III}$ is Si or Sn and X is a halogen; $n'$ is an integer of 1 or 2; and $n''$ is an integer of 1 to 3 and (2) the group of organometallic compounds of the general formula $R_3M^{II}$, $R_4M^{III}$ wherein R, $M^{II}$ and $M^{III}$ are as indicated above and wherein said sensitizer (B) consists of at least one compound selected from polynuclear aromatic compounds consisting of naphthalene, α-chloronaphthalene, and anthracene.

References Cited

FOREIGN PATENTS

| | | | |
|---|---|---|---|
| 860,067 | 2/1961 | Great Britain | 204—159.23 |
| 1,123,724 | 8/1968 | Great Britain | 260—82.5 |
| 2,020,772 | 11/1970 | Germany | 260—82.5 |

OTHER REFERENCES

Furukawa et al.: Novel Synthetic Rubber by Alternating Copolymers, Symposium of Japanese Chemical Fiber Institute, pp. 83–98 (translation), October 1968.

JOHN C. BLEUTGE, Primary Examiner

R. B. TURER, Assistant Examiner

U.S. Cl. X.R.

96—115 P; 260—45.7 R, 45.7 S, 45.8 R, 82.5